J. ALLENDER, dec'd.
T. ALLENDER, Exc't'r.
Wringing-Machine.
No. 6,289. Reissued Feb. 9, 1875.
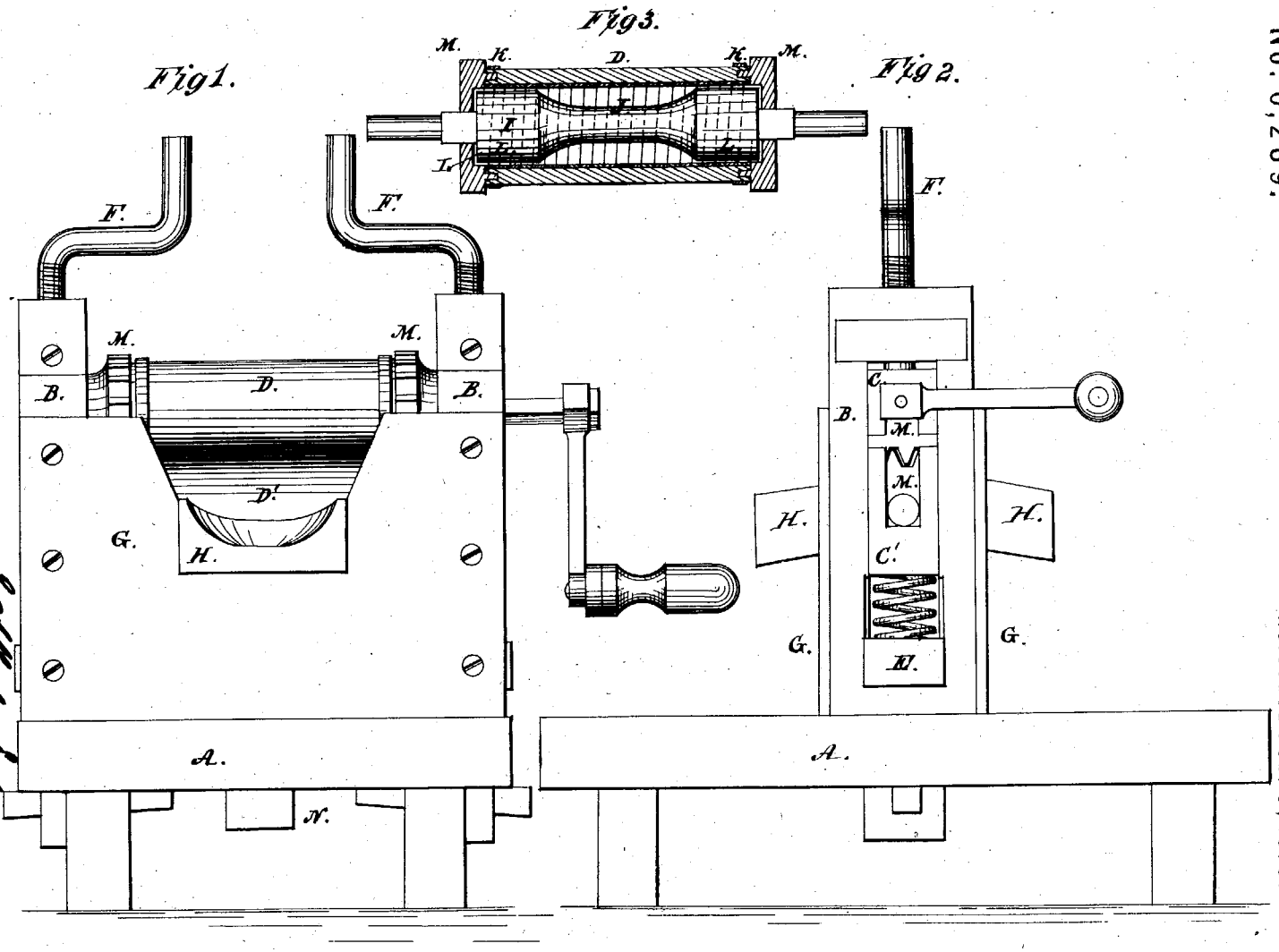
Witnesses:
Chas. J. Hooch
A. Langdon
J. Allender Dec'd
T. Allender Exr.
Bailey Washing Wringer
Machine Company Assignee
Per Somes & Co.
Attorneys

UNITED STATES PATENT OFFICE.

BAILEY WASHING AND WRINGING MACHINE COMPANY, OF WOONSOCKET, RHODE ISLAND, ASSIGNEE, BY MESNE ASSIGNMENTS, OF THOMAS ALLENDER, EXECUTOR OF JOHN ALLENDER, DECEASED.

IMPROVEMENT IN WRINGING-MACHINES.

Specification forming part of Letters Patent No. 22,539, dated January 11, 1859; reissue No. 1,709, dated June 28, 1864; reissue No. 1,807, dated November 8, 1864; reissue No. 1,934, dated April 18, 1865; extended seven years; reissue No. 6,289, dated February 9, 1875; application filed December 23, 1874.

DIVISION B.

*To all whom it may concern:*

Be it known that JOHN ALLENDER, deceased, late of the city and county of New London, in the State of Connecticut, invented a new and useful Improvement in Apparatus for Wringing Clothes, of which the following is a specification sufficiently full, clear, and exact to enable others skilled in the art to which the invention appertains to make and use the same, reference being had to the annexed drawings forming a part hereof.

Figure 1 is a front elevation of said invention. Fig. 2 is a side elevation of the same. Fig. 3 is a view in section of the squeezing-rollers.

The invention consists in a portable bench or stand, with upright standards supporting a pair of elastic squeezing-rollers impervious to water. These standards are so arranged as to admit of a tub being placed on the bench on each side of the wringer mechanism. Thus the clothes are readily taken from the tub on one side and passed between the rolls, falling into a tub or basket placed on the opposite side of the standards supporting the rolls. The convenience of this arrangement of parts is very great, and it very much facilitates the operation of washing, the more especially as the clothes will usually be passed through the wringer several times during the cleansing process.

In the drawings, A is the bench supported upon legs. B B are the upright standards, fastened into the bench at or near the center of its length. In each of these standards there is a long slot, in which the boxes C of the top roller, D, and the boxes C′ of the bottom roller, D′, are fitted to traverse, the boxes C′ being pressed upward by the spiral spring E, placed between the bottom of the slot and the box, as shown in Fig. 2. The screws F F act against the top boxes, C, to press the rollers together, and press them down, and press the boxes C′ against the spring E, to produce the required pressure between the rollers for the cloth or clothes to be squeezed. The standards B B are boarded up on each side of the rollers, as shown in Fig. 1, at G, and a guide, H, is fastened to the boarding G, to guide the cloth or clothes between the rollers. The rollers D D′ consist of a shaft or central roller, I, made smaller in the middle, as shown in Fig. 3. This shaft is surrounded by a flat metal spring, coiled spirally, so as to form a cylinder, J, of uniform diameter from end to end, as shown in section, Fig. 3. Around this spring-cylinder J there is a cylindrical covering, D, made of india-rubber or some flexible material that will yield or bend readily as the spring-cylinder inside of it yields to the pressure of the cloth or clothes passing between the rollers. This india-rubber covering is surrounded with a thin hoop, K, at each end, and is pierced by several spurs, L L, on the gears M M, which are firmly fastened to the shaft I, to make both the rollers turn together as the cloth or clothes being squeezed pass between them, and the water squeezed from the cloth runs from the under roller between the boards G G onto the base A, and through the spout M away from the machine. The central roller, I, being made smaller in the middle, allows the coiled-spring cylinder to yield to the varying thickness of the cloth or clothes passing between the rollers.

What is claimed as the invention is—

A portable stand or bench provided with upright standards, in combination with elastic squeezing-rollers impervious to water, substantially as described.

BAILEY WASHING AND WRINGING MACHINE CO.,
By S. A. BAILEY, *General Agent.*

Witnesses:
D. E. SOMES,
FRANK CHASE SOMES.